United States Patent
Sano

(10) Patent No.: US 8,576,052 B2
(45) Date of Patent: Nov. 5, 2013

(54) RF TAG READER AND WRITER

(75) Inventor: Kouichi Sano, Shizuoka-ken (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 476 days.

(21) Appl. No.: 12/877,255

(22) Filed: Sep. 8, 2010

(65) Prior Publication Data

US 2011/0063092 A1  Mar. 17, 2011

(30) Foreign Application Priority Data

Sep. 15, 2009  (JP) ................................. 2009-212792

(51) Int. Cl.
G08C 17/02  (2006.01)

(52) U.S. Cl.
USPC ................ 340/10.51; 340/572.8; 340/10.1; 340/10.52; 340/10.34; 340/572.3; 235/385; 235/375; 235/435

(58) Field of Classification Search
USPC ............ 340/10.1, 572.8, 572.1, 10.52, 572.3, 340/5.92, 10.2, 10.34, 10.51; 235/385, 375, 235/435
See application file for complete search history.

(56) References Cited

U.S. PATENT DOCUMENTS

| | | | | |
|---|---|---|---|---|
| 2005/0269407 A1* | 12/2005 | Harmon | ........................ | 235/435 |
| 2006/0221363 A1* | 10/2006 | Roth et al. | ..................... | 358/1.6 |
| 2007/0046439 A1* | 3/2007 | Takaku et al. | .............. | 340/10.41 |
| 2007/0067325 A1* | 3/2007 | Weitzner et al. | .............. | 707/101 |
| 2007/0115125 A1* | 5/2007 | Lyon et al. | .................. | 340/572.1 |
| 2007/0152058 A1* | 7/2007 | Yeakley et al. | .......... | 235/462.01 |
| 2007/0188306 A1* | 8/2007 | Tethrake et al. | ........... | 340/10.51 |
| 2007/0188328 A1* | 8/2007 | Mochizuki et al. | ........ | 340/572.7 |
| 2007/0216525 A1* | 9/2007 | Toshiaki et al. | ............... | 340/500 |
| 2007/0286227 A1* | 12/2007 | Koezuka | ........................ | 370/445 |
| 2008/0001721 A1* | 1/2008 | Tanaka | ........................ | 340/10.31 |
| 2008/0288625 A1* | 11/2008 | Agarwal et al. | ............... | 709/223 |

FOREIGN PATENT DOCUMENTS

| | | |
|---|---|---|
| JP | 2001-283163 | 10/2001 |
| JP | 2007-110611 | 4/2007 |
| JP | 2008-129652 | 6/2008 |
| JP | 2009-025963 | 2/2009 |
| JP | 2009-053917 | 3/2009 |
| JP | 2009-075728 | 4/2009 |
| JP | 2009-088779 | 4/2009 |

* cited by examiner

Primary Examiner — Benjamin C Lee
Assistant Examiner — Chico A Foxx
(74) Attorney, Agent, or Firm — Turocy & Watson, LLP

(57) ABSTRACT

The present invention relates to an RF tag reader and writer including: a communication unit which communicates with an RF tag as a target from which information is obtained and obtains the information held in the RF tag; and a communication stability determination unit which determines that stable communication with a specific RF tag is being established when the same information is obtained over a predetermined plural number of times from the RF tag communicating with the communication unit.

9 Claims, 22 Drawing Sheets

FIG.6

| IDENTIFICATION ID | NUMBER OF SUCCESSFUL READING TIMES (a) | READING TIMES (n) |
|---|---|---|
| 15225553 | 3 | 3 |

FIG.7

| IDENTIFICATION ID | 15225553 |
|---|---|
| DETERMINATION RESULT | ○ |
| NUMBER OF SUCCESSFUL READING TIMES | 3 |

PLEASE SELECT THE OPERATION TO BE EXECUTED.

1: INVENTORY COUNTING (COLLECTIVE READING PROCESS)

2: READING FROM SPECIFIC RF TAG (SELECTIVE READING PROCESS)

3: ISSUING OF RF TAG (SELECTIVE WRITING PROCESS)

FIG.16

| IDENTIFICATION ID | 15225553 | | | | | | | | | |
|---|---|---|---|---|---|---|---|---|---|---|
| TRANSMISSION OUTPUT | P01 (=Pmin) | P02 | P03 | P04 | P05 | P06 | P07 | P08 | P09 | P10 (=Pmax) |
| DETERMINATION RESULT | × | ○ | ○ | ○ | ○ | ○ | ○ | ○ | × | × |
| READING TIMES (n) | 1 | 1 | 3 | 3 | 3 | 3 | 3 | 3 | 1 | 0 |

FIG.21

| IDENTIFICATION ID | 15225553 |
|---|---|
| WRITING DETERMINATION RESULT | ○ |
| NUMBER OF SUCCESSFUL READING TIMES | 3 |

RF TAG READER AND WRITER

CROSS-REFERENCE TO RELATED APPLICATION

This application is based upon and claims the benefit of priority from Japanese Patent Application No. 2009-212792, filed on Sep. 15, 2009; the entire contents of which are incorporated herein by reference.

FIELD

The embodiments described in this specification relate to a communication technique by an RF tag reader and writer for communicating with an RF tag in a non-contact manner.

BACKGROUND

The RFID (Radio Frequency Identification) system is attracting attention and, for example, is being introduced in the field of distribution and the like. The RFID system includes an IC chip and an antenna, and is constituted by an RF tag (also referred to as a wireless tag or an RFID tag) attached to each product and an RF tag reader and writer (hereinafter, also simply referred to as a reader and writer) for reading information stored in a memory within the IC chip of the RF tag in a non-contact manner and writing information in the memory within the IC chip of the RF tag in a non-contact manner.

In regard to processing by the RFID system, a collective information reading process from a plurality of RF tags (hereinafter, referred to as collective reading) in regard to counting inventory in a shop or the like can be exemplified. At this time, the reader and writer radiates radio waves in a range of up to several meters, executes communication with unspecified RF tags each of which is attached to each of a plurality of commercial products, and collectively reads the information stored in the respective RF tags. In addition, in regard to other processing by the RFID system, it is possible to exemplify reading and writing processes with respect to one or a plurality of specific RF tags (hereinafter, both of which are referred to as selective reading and selective writing, respectively, and are together referred to as selective communication). At this time, the reader and writer selectively reads information from specific RF tags or selectively writes information in the RF tags.

Here, there are cases where selective writing process or the like is performed in the circumstances of a shop or the like, in which there are a number of commercial products with the RF tags attached. In such circumstances, information may be written to an RF tag which is different from an RF tag to which a user desires to write the information, as a result of the communication with nearby RF tags by mistake. Accordingly, in the conventional technique, depending on the operation, the user was required to use both a reader and writer for collective reading and a reader and writer for selective communication, which has a smaller radio wave transmission output and has a narrower range of directionality than that of the reader and writer for collective reading. In addition, when performing selective communication, the user was required to perform an action such as keeping RF tags which were not communication targets away from the vicinity of the antenna device of the reader and writer.

BRIEF DESCRIPTION OF THE DRAWINGS

FIG. 6 is a diagram illustrating an example of a result table according to the first embodiment.

FIG. 7 is a diagram illustrating an example of a determination table according to the first embodiment.

FIG. 9 is a diagram illustrating an example of a process designation screen in the first embodiment.

FIG. 16 is a diagram illustrating an example of a determination table according to the second embodiment.

FIG. 21 is a diagram illustrating a communication process flow with an RF tag in the fourth embodiment.

DETAILED DESCRIPTION

First Embodiment

According to a first embodiment, an RF tag reader and writer includes a communication unit and a communication stability determination unit. The communication unit communicates with an RF tag as a target from which information is obtained, and obtains information held in the RF tag. In addition, the communication stability determination unit determines that the stable communication with a specific RF tag is being established when an identical piece of information is obtained a predetermined plural number of times from the RF tag with which the communication unit communicates.

Hereinafter, the description will be made of the embodiment with reference to the drawings. The following description will be made while exemplifying an identification ID (tag ID) as the information to be read from or written to the RF tag.

Figure 1:
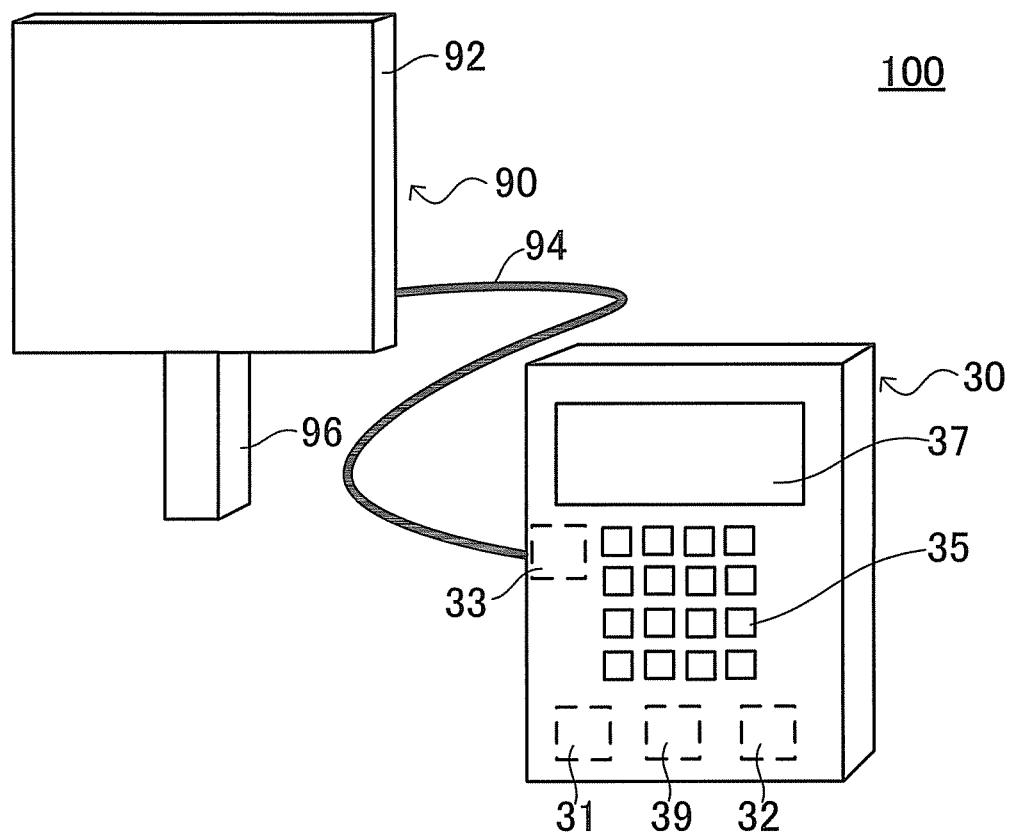
FIG. 1 is a perspective view of an RF tag reader and writer of a first embodiment.

FIG. 1 is a perspective view illustrating a schematic configuration of an RF tag reader and writer 100 according to the first embodiment. The reader and writer 100 of the first embodiment includes an antenna device 90 provided with an antenna (not illustrated) in a case body 92 and a reader and writer main body 30. The antenna device 90 and the reader and writer main body 30 are connected by a coaxial cable 94.

The antenna provided in the antenna device 90 is not particularly limited, and may be a patch antenna, for example. The reader and writer 100 communicates with the RF tag (not illustrated) via radio waves radiated from the antenna. In the first embodiment, the antenna case body 92 is provided with a grip member 96 for facilitating gripping of the antenna device 90 when the user uses the reader and writer 100 while carrying it. However, it is needless to say that the antenna case body 92 can be configured without the grip member 96.

Figure 2:
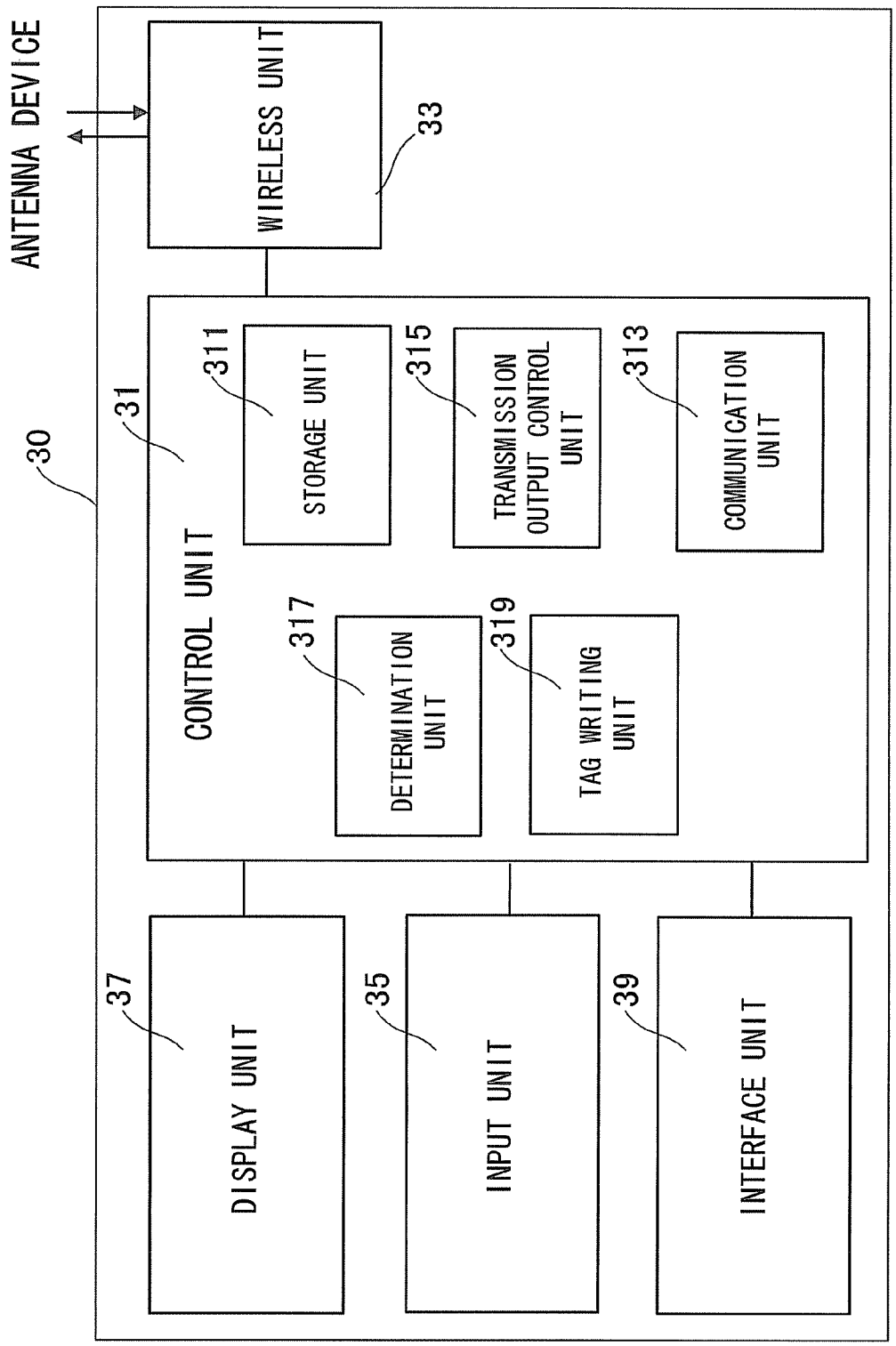
FIG. 2 is a block diagram illustrating a hardware configuration of the RF tag reader and writer of the first embodiment.

A description will be made of a configuration of hardware provided in the reader and writer main body 30. As shown in FIG. 2, the reader and writer main body 30 includes a control unit 31, a wireless unit 33, an input unit 35, a display unit 37, and an interface unit 39. In addition, a power source unit 32, which controls a battery and the charge and discharge thereof, shown in FIG. 1 supplies a current to each hardware unit and the antenna device 90. Accordingly, the reader and writer 100 of the first embodiment is configured as a mobile reader and writer.

The control unit 31 has a function for performing various processes in the reader and writer 100, such as communication with the RF tag or communication with external devices such as a personal computer (not illustrated), and the like, via a network, by executing a program stored in a storage unit 311, which will be described later, based on input from a user. For example, the control unit 31 controls the wireless unit 33 in accordance with a communication protocol such that an identification ID, which is obtained by a personal computer via the interface unit 39 which will be described later or which is input by the user via the input unit 35 which will be described later, is transmitted from the antenna device 90 to the RF tag via radio waves. In addition, the control unit 31 includes the storage unit 311, a transmission output control unit 315, a determination unit 317, and a tag writing unit 319, which will be described later. Here, the control unit 31 displays on the display unit 37 a process result by the determination unit 317 and the tag writing unit 319 based on the notification from the determination unit 317 and the tag writing unit 319. In addition, the control unit 31 determines the process type designated by a user in response to the notification from the determination unit 317, and controls the writing process by the tag writing unit 319 in accordance with the determination result. Moreover, the control unit 31 designates the output information to be used by the transmission output control unit 315 based on the input such as a user's designation of the process or the like.

The storage unit 311 stores the obtained identification ID, a record (log) of the respective commands, and the communication protocol for transmitting the identification ID via radio waves (a communication protocol for RF tags which complies with, for example, ISO18000-6). In addition, the storage unit 311 stores the output information which is the information to be used by the transmission output control unit 315, which will be described later, regarding the magnitude of the transmission output corresponding to any one of types of processes of collective reading, selective reading, and selective writing. Furthermore, in the first embodiment, the storage unit 311 stores a determination table indicating a determination result of the communication stability by the determination unit 317, which will be described later, and a result table to be used for the determination of the communication stability. Moreover, in the first embodiment, the storage unit 311 stores various pieces of setting information regarding the setting for the determination of the communication stability by the determination unit 317. A description will be made of such setting information along with a description for the respective functional blocks. In addition, in regard to this setting information, additions, modifications, and deletions of the setting conditions can be made by the user's input via the input unit 35 or the like, which will be described later.

The communication unit 313 performs the selective reading of the RF tag in accordance with the protocol of ISO18000-6type C.

The transmission output control unit 315 controls the wireless unit 33, which will be described later, to cause the antenna device 90 to radiate radio waves at a transmission output indicated by the information based on the output information stored in the storage unit 311.

The determination unit 317 performs the predetermined plural number of times of selective reading of the communication unit 313, and determines whether or not stable communication with a specific RF tag is being established based on the result of the plural number of times of selective readings (determination of the communication stability).

When the tag writing unit 319 obtains a command input via the input unit 35, which will be described later, for requesting selective writing and the determination unit 317 determines that the stable communication is being established, the tag writing unit 319 performs writing to the RF tag. In addition, the tag writing unit 319 causes the communication unit 313 to perform selective reading and performs a writing process when the thus obtained identification ID coincides with the identification ID obtained in the determination by the determination unit 317.

Specifically, the control unit 31 of the first embodiment can be configured with a CPU, a RAM, and a ROM mounted on the reader and writer main body 30.

Figure 3:
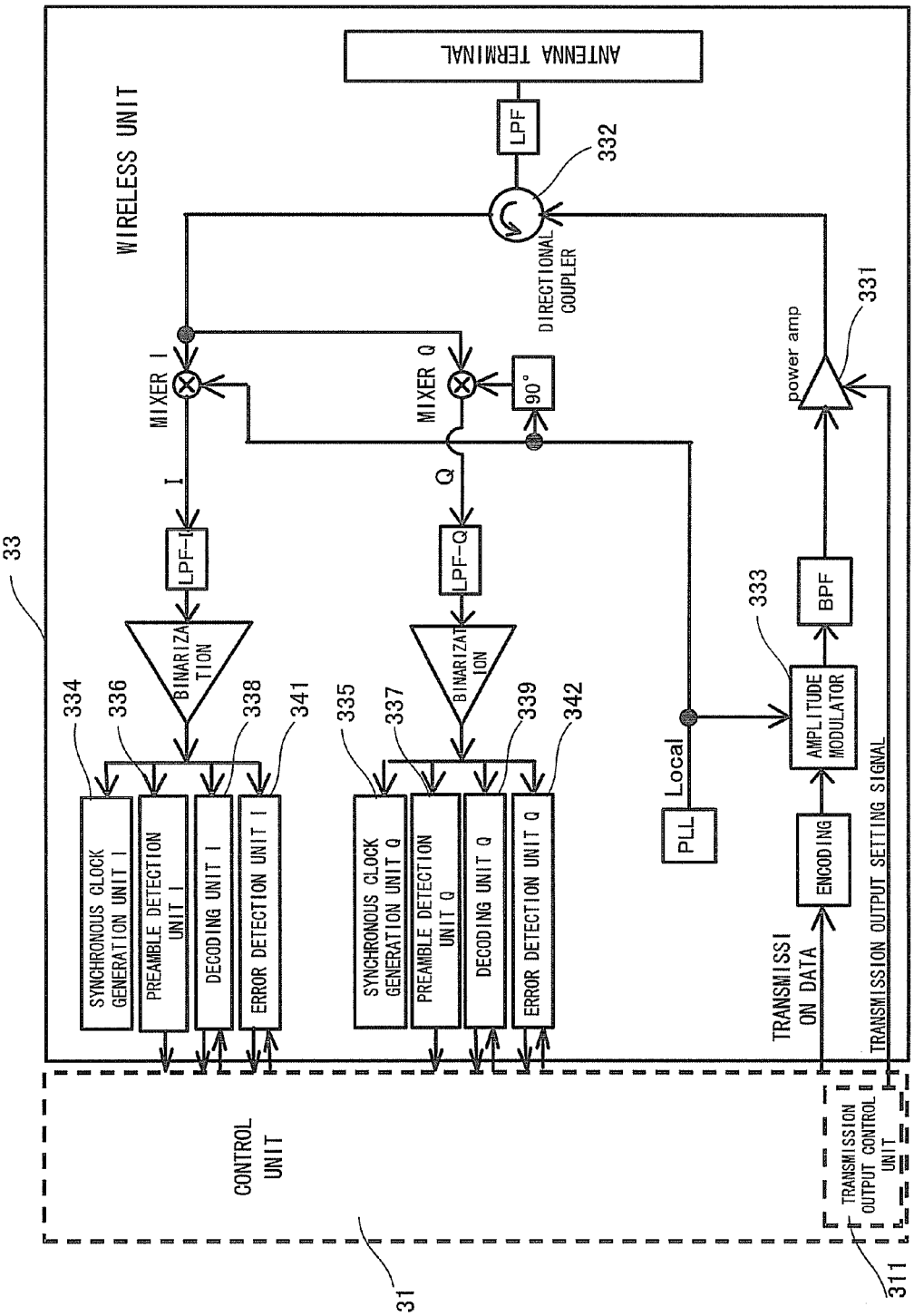
FIG. 3 is a circuit configuration diagram of a wireless unit included in the RF tag reader and writer of the first embodiment.

The wireless unit 33 is hardware with a function of communicating with the RF tag via the antenna device 90. FIG. 3 is a detailed circuit configuration diagram of the wireless unit 33.

Here, if the RF tag is a passive tag with no battery, the wireless unit 33 first amplifies a non-modulated carrier with a power amplifier 331, outputs electromagnetic waves from the antenna via a directional coupler 332, and activates the RF tag. When transmitting data to the RF tag, the wireless unit subjects the signal which is encoded in accordance with the communication protocol to an amplitude modulation at an amplitude modulator 333, then amplifies the signal with the power amplifier 331, subsequently outputs electromagnetic waves from the antenna via the directional coupler 332, and thereby transmits the data. In addition, when a signal is received from the RF tag, the RF tag controls (back scatters) impedance at the end of the antenna while the reader and writer 100 is transmitting the non-modulated carrier, thereby the reflection state is changed, and the antenna device of the reader and writer 100 detects the change. The directional coupler 332 performs orthogonal demodulation on the received electromagnetic wave signal, and synchronous clock generation units I (334) and Q (335) generate a synchronous clock. Then, preamble detection units I (336) and Q (337) detect a predetermined preamble to thereby detect the head of the data, and decoding units I (338) and Q (339) perform decoding to obtain the received data. In addition, error detection units I (341) and Q (342) are configured to detect the existence of errors using an error detection code. FIG. 3 shows a configuration in which it is determined that the data is appropriately received if there is no error in either the demodulation of the in-phase component of the orthogonal demodulation or the demodulation of the orthogonal component. In addition, the power amplifier 331 is configured so as to be able to set the transmission output depending on the type of the process based on the control by the transmission output control unit 315 of the control unit 31 (specifically, the transmission of the transmission output setting signal to set the transmission output).

The input unit 35 is hardware through which a user inputs an instruction to the reader and writer 100, and specifically, can be configured with buttons (keys) capable of inputting instructions by being pressed, a touch pad, and the like.

The display unit 37 is hardware which can be used to show the result of communication with the RF tag to the user and to encourage the user to input instructions, and specifically, can be configured by an LCD (Liquid Crystal Display) or the like. In addition, the display unit 37 may be configured as a graphical display with a touch panel sensor mounted thereon, and the input unit 35 and the display unit 37 may be integrated.

The interface unit 39 is hardware for communicating with an external device such as a personal computer, which stores identification IDs, via a network.

Figure 4:
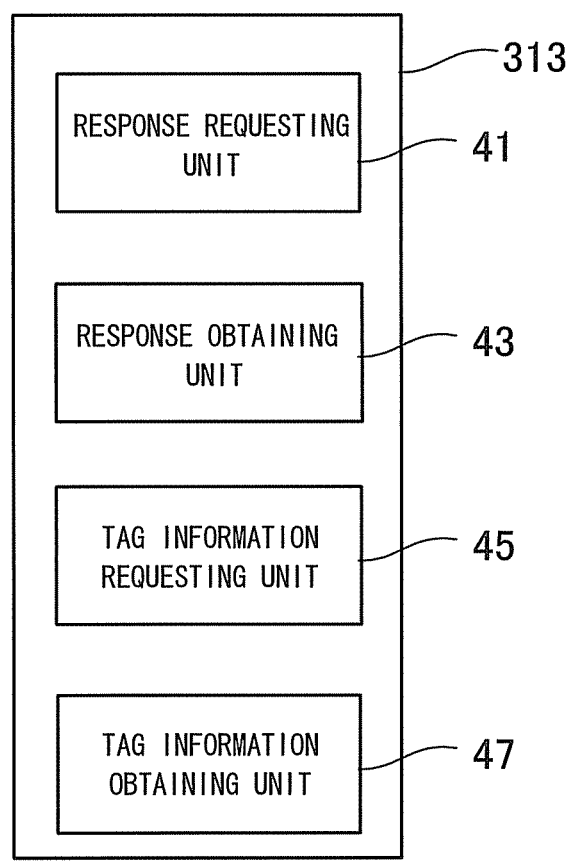
FIG. 4 is a functional block diagram of a communication unit according to the first embodiment.
Figure 5:
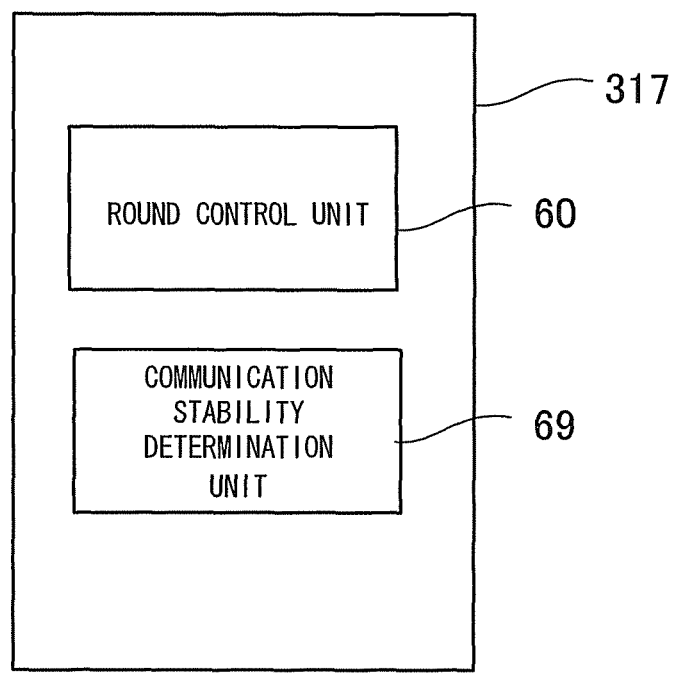
FIG. 5 is a functional block diagram of a determination unit according to the first embodiment.

Next, the functions of the determination unit 317 in the control unit 31 and the plural number of times of selective readings by the communication unit 313, which is controlled by the determination unit 317, will be described in detail with reference to FIGS. 4 and 5. As shown in FIG. 4, the communication unit 313 includes a response requesting unit 41, a response obtaining unit 43, a tag information requesting unit 45, and a tag information obtaining unit 47. In addition, as shown in FIG. 5, the determination unit 317 includes a round control unit 60 and a communication stability determination unit 69.

The round control unit 60 controls the selective reading by the communication unit 313, which will be described later, and registers an identification ID of the RF tag, which is obtained by the selective reading by the communication unit 313, a number of times by which the ID is obtained (number of successful reading times), and round number information, which will be described later, in a result table as shown in FIG. 6 stored in the storage unit 311.

A detailed description will be made regarding the control of the selective reading by the communication unit 313. When the start of the selective reading or the selective writing is requested via the input unit 35, the round control unit 60 obtains the round number information from the storage unit 311, and causes the communication unit 313 to perform the predetermined plural number of times of selective readings based on the round number information. In addition, the round number information is one piece of the setting information regarding the determination of the communication stability by the determination unit 317, which is stored in the storage unit 311, and is the information regarding the predetermined plural number of times by which the selective reading is performed.

The control of the selective reading by the communication unit 313 will be described in more detail. The round control unit 60 notifies the response requesting unit 41 of the communication unit 313, which will be described later, of the start of the selective reading (sending of the start command), then obtains an identification ID from the tag information obtaining unit 47, which will be described later, and notifies again the response requesting unit 41 of the start of the selective reading. Then, the round control unit 60 repeats the process in accordance with the number of times indicated by the round number information.

The communication unit 313 performs the predetermined plural number of times of selective readings in accordance with the protocol of ISO18000-6type C based on the control by the round control unit 60. Then, the communication unit 313 sends the identification ID of the RF tag, which is obtained in the selective reading, to the round control unit 60.

More specifically, when the response requesting unit 41 of the communication unit 313 obtains from the round control unit 60 the start command for starting the selective reading, the response requesting unit 41 obtains slot number information from the storage unit 311, and sets the slot number for each of the selective readings based on the slot number information. That is, in the first embodiment, the response requesting unit 41 also functions as a slot number setting unit. In addition, the slot number information is one piece of the setting information regarding the selective reading by the communication unit 313, which is stored in the storage unit, and is the information for designating the slot number (the slot number for each one round) for each of the selective readings based on the slot ALOHA method. According to ISO18000-6type C, the slot number for one round is defined as 2 to the power of Q. For example, in the case of Q=2, the slot number becomes 4, and in the case of Q=3, the slot number becomes 8.

Next, the response requesting unit 41 sends a response request command (Query) in accordance with the slot number. Then, the response requesting unit 41 notifies the response obtaining unit 43 that the response requesting unit sent Query.

The RF tag which obtained Query generates a random number for determining which slot is to be used for the response, which will be described later. In addition, the RF tag generates RN16, which is a 16 bit random number, for example, as a response in addition to the random number for the determination of the slot. Then, the RF tag sends RN16 in a slot determined by the random number for the determination of the slot.

The response obtaining unit 43 obtains the response (RN16) sent from the RF tag which obtained Query sent from the response requesting unit 41. If the response obtaining unit 43 obtains RN16 within a predetermined time, the response obtaining unit 43 notifies the tag information requesting unit 45 that RN16 was obtained. On the other hand, if the response obtaining unit 43 does not obtain RN16 within the predetermined time, the response obtaining unit 43 notifies the round control unit 60 that RN16 was not obtained.

Here, in the first reader and writer 100, the communication with the RF tag is made in a slot ALOHA method. For this reason, there are cases in which RN16 is sent from a plurality of RF tags to a single slot and collisions occur. If a collision occurs in such a manner, the response obtaining unit 43 does not obtain RN16 from any RF tags in the first embodiment. More specifically, if a collision occurs when the slot number is set to be one, for example, the response obtaining unit 43 notifies the round control unit 60 that RN16 was not obtained.

If the response obtaining unit 43 obtains RN16 within a predetermined time after the response requesting unit 41 sends Query, the tag information requesting unit 45 obtains RN16 from the response obtaining unit, and sends a tag information request command (Ack) for requesting the RF tag, which sent RN16, to send the information (identification ID) held in the RF tag while assuming that communication with the RF tag, which sent RN16, is being established in one slot. In addition, Ack includes the obtained RN16.

When the RF tag obtains Ack, the RF tag determines whether RN16 included in Ack is identical to the sent RN16. If RN16 is identical to the sent RN16, the RF tag sends the identification ID to the reader and writer 100 while assuming that the RF tag itself was selected for the communication in the slot and the RF tag was allowed to send the information held therein. The tag information obtaining unit 47 obtains the identification ID held in the tag, which is sent from the RF tag, which obtained Query and Ack, in accordance with Ack. If the tag information obtaining unit 47 could not obtain the identification ID within the predetermined time after the tag information requesting unit 45 sent Ack, the tag information obtaining unit 47 notifies the round control unit 60 that the identification ID could not be obtained.

The round control unit 60 registers the information regarding the obtained identification ID in the result table stored in the storage unit 311. Specifically, if the obtained identification ID was already stored in the result table, a determination is made such that the same identification ID was obtained as that in the previous selecting reading, and the selective reading times in the table is incremented, and the process proceeds to the next round. On the other hand, if the obtained identification ID was not stored in the result table, the round control unit 60 newly adds the identification ID in the determination table. In addition, if the response obtaining unit 43 notifies that Ack was not obtained, or if the tag information obtaining unit 47 notifies that the identification ID was not obtained, the round control unit 60 does not make a registration in the result table, and the process proceeds to the next round. Then, if the round control unit 60 completes the rounds by a number of times indicated by the round number information, the round control unit 60 notifies the communication stability determination unit 69 of the completion of the rounds.

If the round control unit 60 notified the communication stability determination unit 69 of the completion of the rounds, the communication stability determination unit 69 obtains the result table, communication target information, and stability lower-limit information from the storage unit 311, and based on these, determines whether or not the stable communication with the specific RF tag is being established. In addition, the communication target information is one piece of setting information regarding the communication stability determination by the determination unit 317, which is stored in the storage unit 311, and is information for designating the number of RF tags which are to be communication targets in the selective communication. In addition, the stability lower-limit information is one piece of setting information regarding the communication stability determination by the determination unit 317, which is also stored in the storage unit 311, and is information indicating a reference value (a threshold value) for determining by the communication stability determination unit 69 that the stable communication is being established.

More specifically, if the identification ID was obtained from the RF tags, of which the number is indicated by the communication target information, by a number of times which is equal to or greater than the number of times indicated by the stability lower-limit information, the communication stability determination unit 69 determines that the stable communication is being established. For example, when the communication target information indicates 1 and the stability lower-limit information indicates 3, the determination is made such that the stable communication is being established if only one type of identification ID is stored in the result table, and the result table shows that the identification ID was obtained three times or more.

In addition, the communication stability determination unit 69 causes the determination result, the identification ID, and the number of successful reading times to be stored in the determination table as shown in FIG. 7, which is stored in the storage unit 311, based on the determination result. Moreover, the communication stability determination unit 69 notifies the control unit 31 of the determination result. If the control unit 31 is informed of the determination result, the control unit 31 causes the display unit 37 to display the result. In addition, if the process requested by a user via the input unit is the selective writing, the control unit 31 controls the tag writing unit 319 to execute the writing process (sends a writing start command).

Next, a description will be made of the selective writing by the tag writing unit 319. In the first embodiment, if the tag writing unit 319 obtains the writing start command from the control unit 31, the tag writing unit 319 causes the communication unit 313 of the determination unit 317 to execute the selective reading to obtain the identification ID. That is, in the first embodiment, when it is determined that the stable communication is being established by the communication stability determination unit 69, the tag writing unit 319 executes the information writing process.

Subsequently, the tag writing unit 319 obtains the determination table from the storage unit 311, and determines whether the thus obtained identification ID is identical to the identification ID in the determination table. If the obtained identification ID is identical to the identification ID in the determination table, the tag writing unit 319 obtains the information for the writing (new identification ID) stored in the storage unit 311, and executes the writing to the RF tag.

Figure 8:
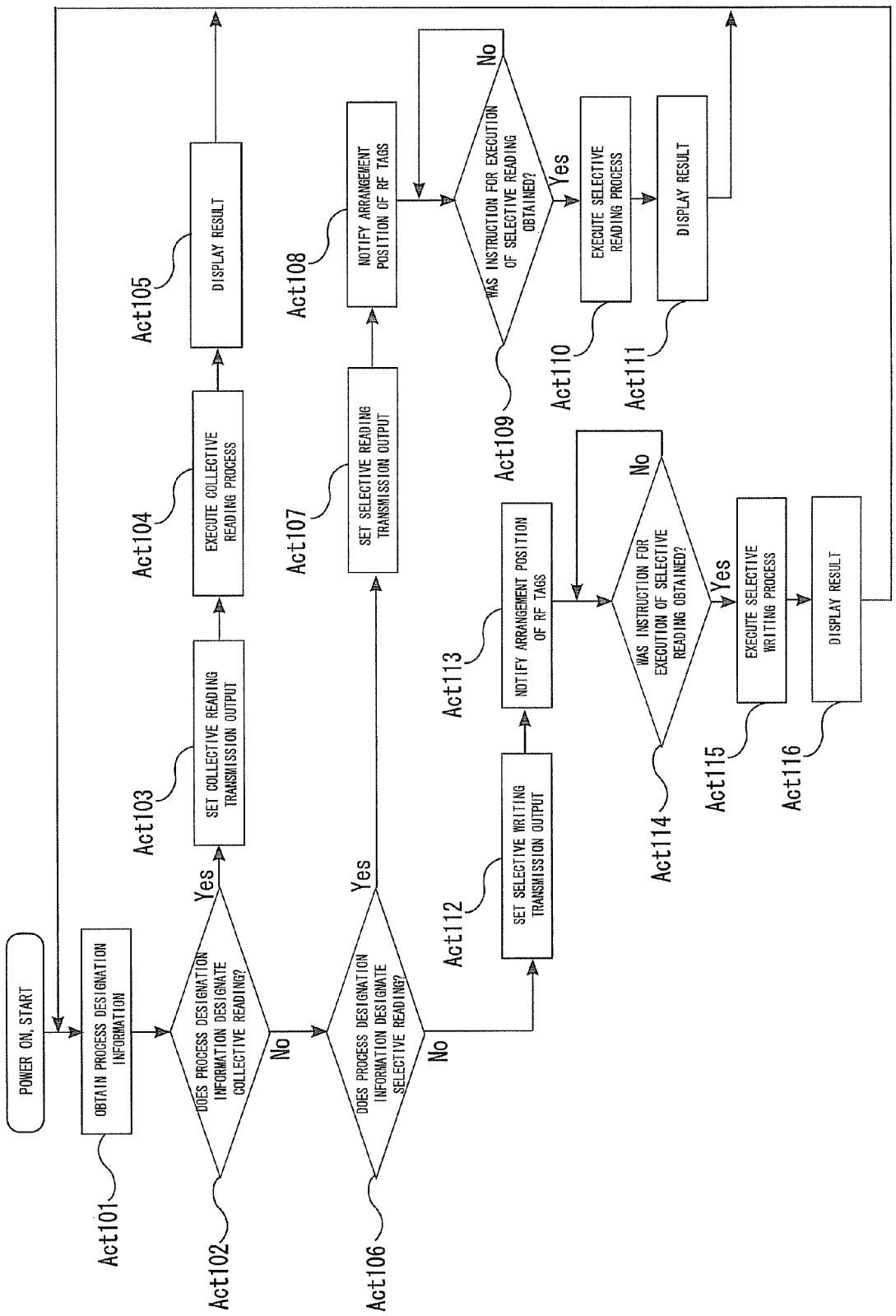
FIG. 8 is a diagram illustrating a communication process flow with an RF tag in the first embodiment.

Next, a description will be made of the process flow for the communication with the RF tag relating to collective reading, selective reading, or selective writing by the reader and writer 100 of the first embodiment with reference to FIG. 8. In the following description, the magnitude of the transmission output for the respective processes and the number of the RF tags to be communicated with in selective communication are preset in the reader and writer main body 30.

First, in Act 101, the control unit 31 obtains the process designation information indicating which process is to be executed from among collective reading, selective reading, and selective writing, based on input from the user. Specifically, the control unit 31 configures a process designation screen 51 as shown in FIG. 9, and causes the display unit 37 to display the screen. The user designates a desired process via the input unit 35 based on the process designation screen 51 displayed on the display unit 37. The control unit 31 obtains the process designation information from the user's designation via the input unit 35.

Next, in Act 102, the control unit 31 determines whether the obtained process designation information designates collective reading. If the information designates collective reading, the transmission output control unit 315 of the control unit 31 sets the transmission output for the wireless unit 33 based on the collective reading output information stored in the storage unit 311 in Act 103.

Figure 10:
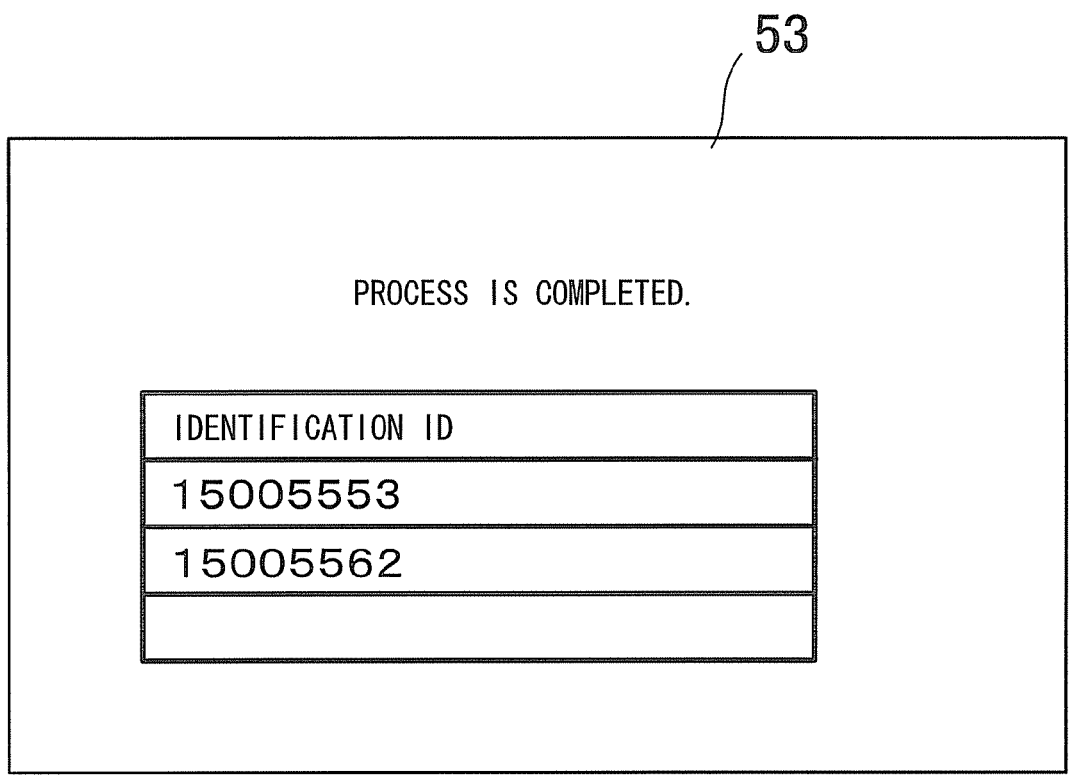
FIG. 10 is a diagram illustrating an example of a result notification screen in the first embodiment.

Next, in Act 103, the control unit 31 controls the wireless unit 33 to cause the antenna device 90 to radiate radio waves for collective reading, thereby performing collective reading, and obtains the information (identification ID) held in the RF tag. Then, in Act 105, the control unit 31 configures a process result screen 53 (FIG. 10) for informing of the completion of the process and causes the display unit 37 to display the screen, and the process returns to Act 101. If the executed process is collective reading, described herein, or selective reading, which will be described later, the control unit 31 displays the obtained identification ID along with the notification of the completion of the process on the process result screen and notifies the user. In addition, if the control unit 31 cannot obtain the identification ID, the control unit displays the notification of the failure of the communication with the RF tag instead of the content shown in FIG. 10 on the process result screen 53 and notifies the user.

On the other hand, if it is determined that the process designation information does not designate collective reading in Act 102, the process proceeds to Act 106, and the control unit 31 determines whether the process designation information designates selective reading. If the information designates selective reading, the process proceeds to Act 107, and the transmission output control unit 315 of the control unit 31 sets the transmission output for the wireless unit 33 based on the selective reading output information stored in the storage unit 311.

Figure 11:
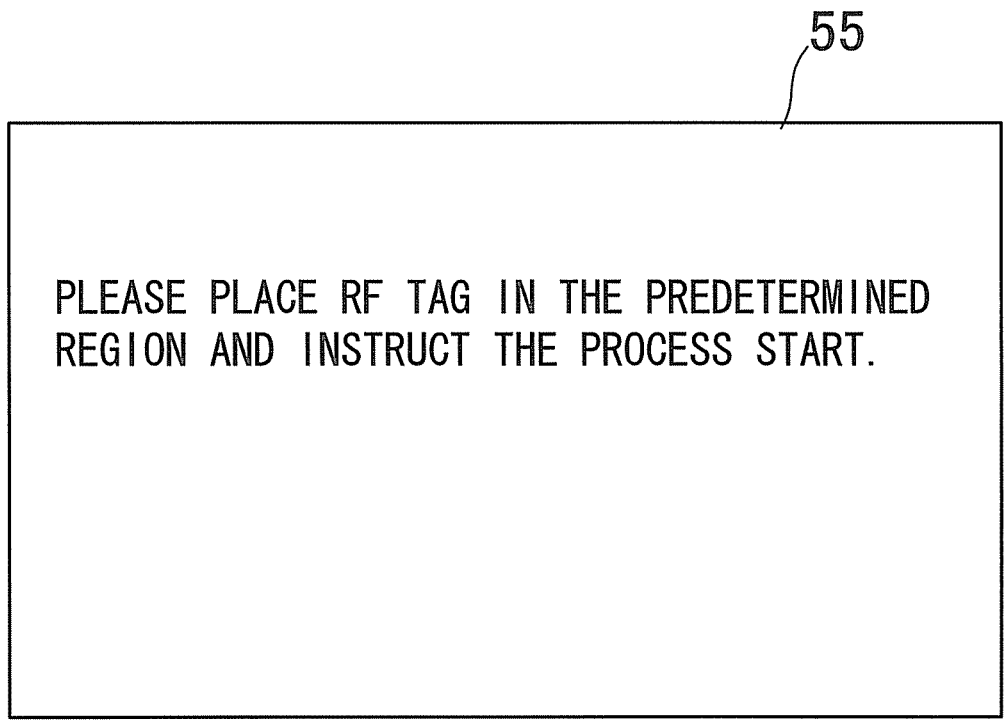
FIG. 11 is a diagram illustrating an example of a process start screen in the first embodiment.

Next, in Act 108, the control unit 31 configures a process start screen 55, as shown in FIG. 11, for encouraging the movement of the RF tag to a predetermined region in the vicinity of the antenna device 90 and obtaining the user's instruction relating to the reading start, and causes the display unit 37 to display the process start screen 55. Then, the process proceeds to Act 109, and the control unit 31 determines whether the information regarding the reading start is obtained. If the user places the RF tag in the predetermined region and inputs the instruction for the reading start via the input unit 35, the control unit 31 obtains an instruction relating to the reading start, and the process proceeds to Act 110. In Act 110, the control unit 31 controls the wireless unit 33 to cause the antenna device 90 to radiate the radio waves for selective reading, performs the selective reading process, and obtains the identification ID held in the respective RF tags. Thereafter, in Act 111, the control unit 31 causes the display unit 37 to display the process result screen 53 for notifying the obtained identification ID along with the completion of the process, and the process returns to Act 101.

In Act 106, if it is determined that the process designation information does not designate selective reading, the control unit 31 determines that the process designation information designates selective writing. Then, the process proceeds to Act 112, and the transmission output control unit 315 of the control unit 31 sets the transmission output for the wireless unit 33 based on the selective reading output information stored in the storage unit 311.

Next, in Act 113, the control unit 31 configures the process start screen as shown in FIG. 11 for encouraging the movement of the RF tag to the region indicated by an indicating unit 16 and obtaining the user's instruction regarding the reading start, and causes the display unit 37 to display the screen. Subsequently, the process proceeds to Act 114, and the control unit 31 determines whether or not the instruction for the reading start is obtained. If the user places the RF tag in the region on the antenna case body, which is indicated by the indicating unit 16, and inputs the reading start instruction via the input unit 35, the control unit 31 obtains the instruction for the reading start, and the process proceeds to Act 115. In Act 115, the control unit 31 controls the wireless unit 33 to cause the antenna device 90 to radiate the radio waves for selective writing, performs selective writing, and gives the identification ID for the respective RF tags. Then, the tag writing unit 319 confirms that the writing is completed based on the responses (Reply) from the RF tag, and notifies the control unit 31 that the Reply is obtained. The control unit 31 configures the process result screen 53 in the same manner as in the case of reading process, and causes the display unit 37 to display the screen (Act 116).

Figure 12:
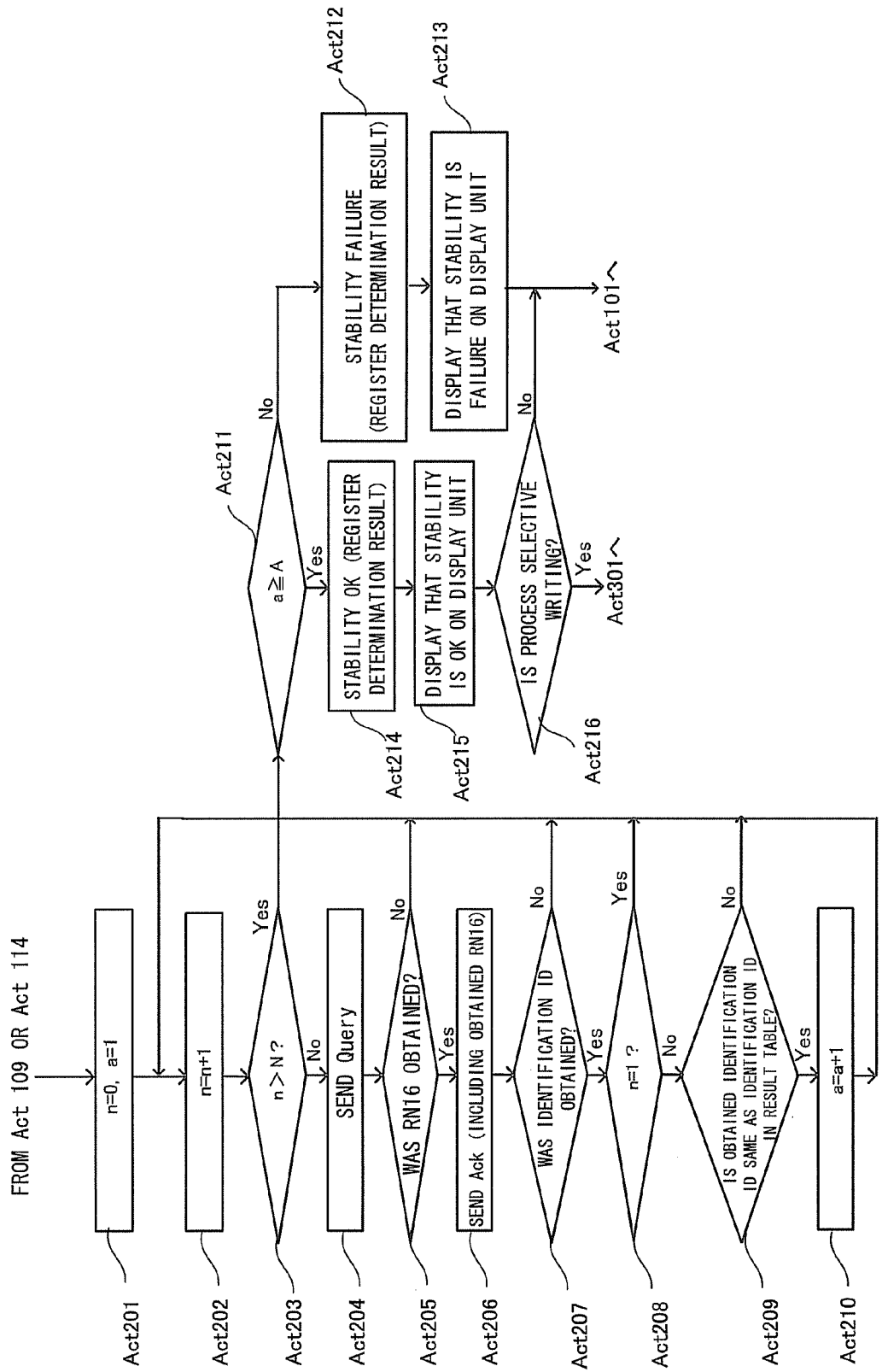
FIG. 12 is a diagram illustrating a selective communication process flow with an RF tag in the first embodiment.

Next, a description will be made of the detailed process flow of the various processes to be executed by the control unit 31, and the display of the result in the selective reading and the selective writing (Act 110, Act 111, Act 115, and Act 116) with reference to FIG. 12. In addition, the following description will be made while assuming that the user sets in advance the round number information of 3, the slot number information of 1, the setting target information of 1, and the stability lower-limit information of 3. Moreover, in the following description, the description regarding the transmitting of the non-modulated carrier prior to the sending of Query will be omitted for easy understanding.

If the start instruction for reading or writing is obtained from the user, the round control unit 60 of the determination unit 317 sets the reading times (n) and the number of successful reading times (a) in the result table stored in the storage unit 311 to be 0 and 1 in Act 201. Then, in Act 202, the round control unit 60 increments the reading times (n) in the result table. The process proceeds to Act 203, and the round control unit 60 obtains the round number information, and determines whether the round number (N) is greater than the reading times (n).

If the reading times (n) is not more than the round number (N), the response requesting unit 41 sets the slot number to 1 based on the slot number information in accordance with the above-mentioned control by the round control unit 60, and sends Query to the RF tag in Act 204. Then, in Act 205, the response obtaining unit 43 determines whether RN16 is obtained. If RN16 can not be obtained within a predetermined time, for example, when a collision occurs, the response obtaining unit 43 notifies the round control unit 60 that RN16 is not obtained. When the round control unit 60 is notified, the round control unit 60 moves on to the next round (returns to Act 202).

If the response obtaining unit 43 can obtain RN16 within the predetermined time, the process proceeds to Act 206, and the tag information requesting unit 45 sends Ack to the RF tag which sent RN16 while assuming that the communication with one RN tag is being established in one slot. Then, in Act 207, the tag information obtaining unit 47 determines whether the identification ID is obtained from the RF tag, which sent RN16, within a predetermined time. If the identification ID can not be obtained within the predetermined time, the tag information obtaining unit 47 notifies the round control unit 60 that the identification ID is not obtained. When the round control unit 60 is notified, the round control unit 60 moves on to the next round (returns to Act 202).

If the tag information obtaining unit 47 can obtain the identification ID within the predetermined time, the round control unit 60 obtains the identification ID from the tag information obtaining unit 47 and determines whether the reading times (n) is 1 in the result table in Act 208. If the reading times (n) is 1, the round control unit 60 registers the identification ID in the result table and moves on to the next round (to Act 202). On the other hand, if the reading times (n) is not 1, the round control unit 60 compares the identification ID which was already registered in the result table with the obtained identification ID to determine whether the two IDs are identical (Act 209). If the identification ID which was already registered and the obtained identification ID are not identical, the round control unit 60 moves on to the next round without incrementing the number of successful reading times (a) in the result table (returns to Act 202). On the other hand, if the identification ID which was already registered and the obtained identification ID are identical, the round control unit 60 increments the number of successful reading times (a) in the result table (Act 210) and moves on to the next round (returns to Act 202). In addition, in the description of this process flow, the processes from Act 202 to Act 210 are repeated two more times and performed three times in total.

On the other hand, when it is determined that the reading times (n) is greater than the round number (N) in Act 203, the process proceeds to Act 211, and the communication stability determination unit 69 determines whether the number of successful reading times (a) in the result table is not less than a value (A, 3 in this description) indicated by the stability lower-limit information obtained from the storage unit 311. If the number of successful reading times is less than 3, the communication stability determination unit 69 determines that the stable communication is not being established, registers the result in the determination table (Act 212), and notifies the control unit 31 of the result. The control unit 31 notifies the user of the result that the stable communication is not being established via a display of the result informing screen on the display unit 37 (Act 213). In addition, if it is determined that the number of successful reading times is not less than 3, the communication stability determination unit 69 determines that the stable communication is being established, registers the result in the determination table (Act 214), and notifies the control unit 31 of the result. The control unit 31 notifies the user of the result via a display of the result notification screen on the display unit 37 (Act 215).

Next, the control unit 31 determines whether not the process input by the user is the selective writing (Act 216). If the process is not the selective writing, that is, if the process is the selective reading, the control unit 31 moves on to Act 101. On the other hand, if the process is the selective writing, the control unit 31 sends a writing start command to the tag writing unit 319, and causes the tag writing unit 319 to execute the writing of the information (new identification ID) (moves to Act 301).

Figure 13:
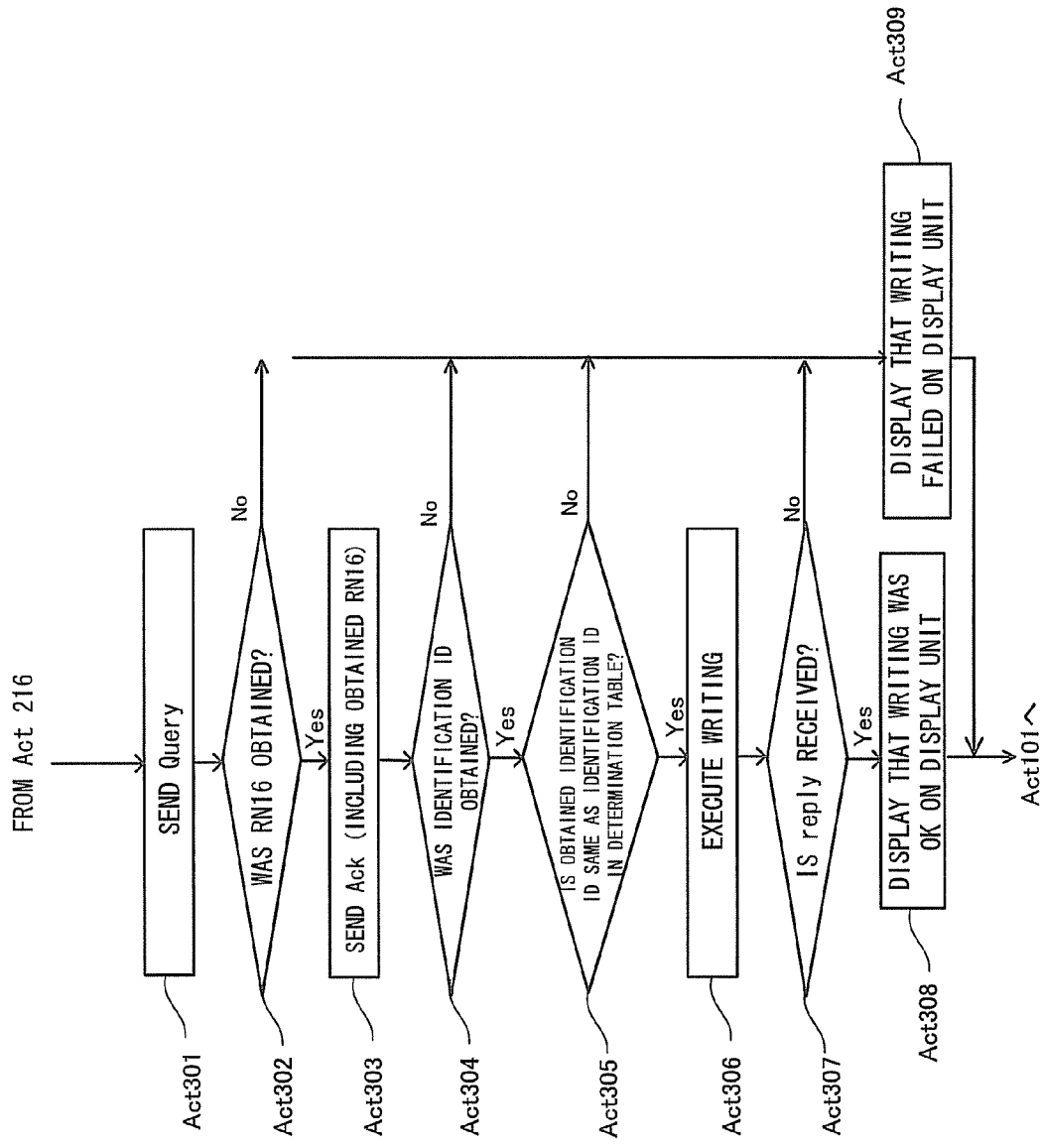
FIG. 13 is a diagram illustrating a selective communication process flow with an RF tag in the first embodiment.
Figure 14:
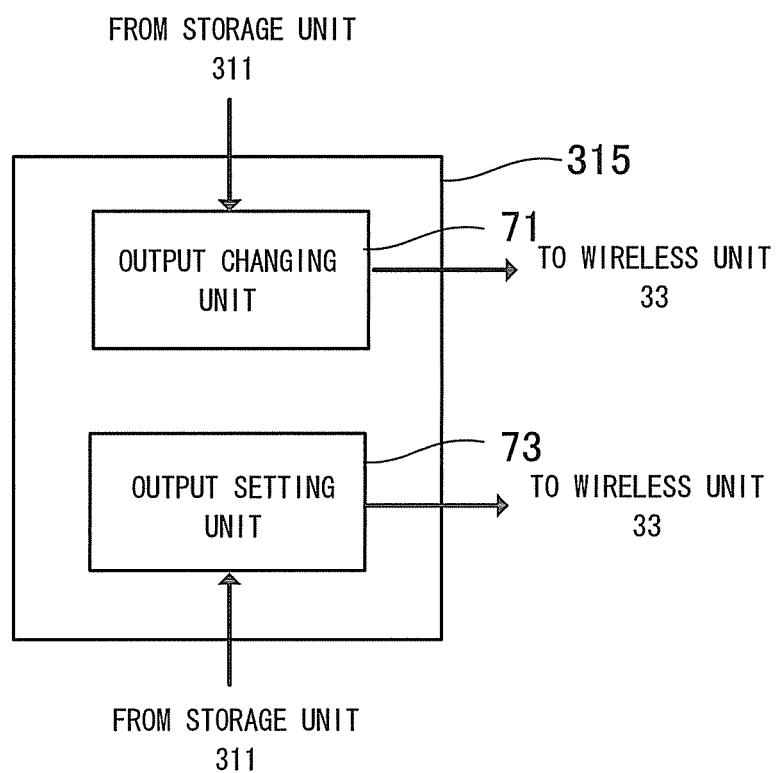
FIG. 14 is a functional block diagram of a transmission output control unit according to a second embodiment.

Next, a description will be made of the writing process flow when it is determined that the process is the selective writing in Act 216, with reference to FIG. 13. At this time, the tag writing unit 319 first causes the communication unit 313 to execute the selective writing. Specifically, in Act 301, the response requesting unit 41 follows the above-mentioned control by the tag writing unit 319, sets the slot number to be one based on the slot number information obtained from the storage unit 311, and sends Query to the RF tag. Then, in Act 302, the response obtaining unit 43 determines whether RN16 is obtained. If RN16 is not obtained in the predetermined time, for example, if a collision occurs, the response obtaining unit 43 notifies the tag writing unit 319 and the control unit 31 that RN16 is not obtained. The tag writing unit 319 completes the process without performing writing based on the notification, and the control unit 31 notifies the user that the writing could not be performed (writing failure) via the display unit 37 (Act 309) and moves on to Act 101.

If the response obtaining unit 43 can obtain RN16 within the predetermined time, the process proceeds to Act 303, and the tag information requesting unit 45 sends Ack to the RF tag which sent RN16. Then, in Act 304, the tag information obtaining unit 47 determines whether the identification ID is obtained from the RF tag, which sent RN16, within the predetermined time. If the identification ID can not be obtained within the predetermined time, the tag information obtaining unit 47 notifies the tag writing unit 319 and the control unit 31 that the identification ID is not obtained. The tag writing unit 319 completes the process without performing the writing based on the notification, and the control unit 31 notifies the user that the writing could not be performed (writing failure) via the display unit 37 (Act 309) and moves on to Act 101.

If the tag information obtaining unit 47 can obtain the identification ID within the predetermined time, the tag writing unit 319 obtains the identification ID from the tag information obtaining unit 47 and determines whether the identification ID registered in the determination table which is obtained from the storage unit 311 is identical to the thus obtained identification ID in Act 305. If it is determined that these identification IDs are not identical, the tag writing unit 319 completes the process without performing the writing and notifies the control unit 31 of the result. The control unit 31 notifies the user that the writing could not be performed (writing failure) via the display unit 37 based on the notification from the tag writing unit 319 (Act 309) and moves on to Act 101.

On the other hand, if it is determined that the identification ID registered in the determination table and the obtained identification ID are identical, the tag writing unit 319 performs the writing process and then notifies the control unit 31 that the writing process was performed in Act 306. Next, in Act 307, the tag writing unit 319 determines whether the Reply was obtained from the RF tag, to which the writing was performed, within a predetermined time after the tag writing unit 319 performs the writing process. If the Reply is not obtained within the predetermined time, the tag wring unit 319 notifies the control unit 31 that the Reply could not be obtained. The control unit 31 notifies the user that the writing could not be performed (writing failure) based on the notification via the display unit 37 (Act 309), and the process proceeds to Act 101. In addition, if the Reply is obtained within the predetermined time, the tag writing unit 319 notifies the control unit 31 that the Reply is obtained. The control unit 31 notifies the user that the writing could be performed (writing OK) via the display unit 37 (Act 308), and the process proceeds to Act 101.

As described above, according to the reader and writer 100 of the first embodiment, it is determined that the stable communication with an RF tag as a communication target is being established when the same information is obtained over a predetermined plural number of times. Accordingly it is possible to more reliably perform the communication with the RF tag with which the user desires to communicate.

Second Embodiment

According to a second embodiment, the storage unit 311 stores the transmission output for the selective communication in the same manner as in the first embodiment. Here, in the second embodiment, it is assumed that the storage unit 311 stores 10-level output information, which respectively indicates different transmission outputs from the transmission output Pmin to the transmission output Pmax. In addition, the transmission output control unit 315 of the control unit 31 in the RF tag reader and writer 100 according to the second embodiment sets the transmission output for the selective writing based on the determination result of the communication stability for the transmission output. Hereinafter, the second embodiment will be described in detail. The same reference numerals will be given to the common configurations to those in the first embodiment, and the description thereof will be omitted.

Figure 15:
FIG. 15 is a diagram illustrating an example of a result table according to the second embodiment.

According to the second embodiment, the transmission output control unit 315 includes an output changing unit 71 and an output setting unit 73 as shown in FIG. 15. In addition, the control unit 31 designates the transmission output to be used by the transmission output control unit 315 and further determines which output information is to be based on for determining the transmission output of the radio waves to be sent.

If the start of the selective writing is requested via the input unit 35, the output changing unit 71 changes the output based on the above-mentioned 10-level output information stored in the storage unit 311, sets the output for the wireless unit 33, and then notifies the round control unit 60 that the transmission output was changed. In addition, in the second embodiment, it is assumed that the setting of the transmission output in Act 112 is not performed.

If the round control unit 60 obtains the notification that the output changing unit 71 changed the transmission output, the round control unit 60 obtains from the storage unit 311 the round number information for designating the number of the selective readings and causes the communication unit 313 to perform the predetermined plural number of times of selective readings based on the round number information.

Figure 17:
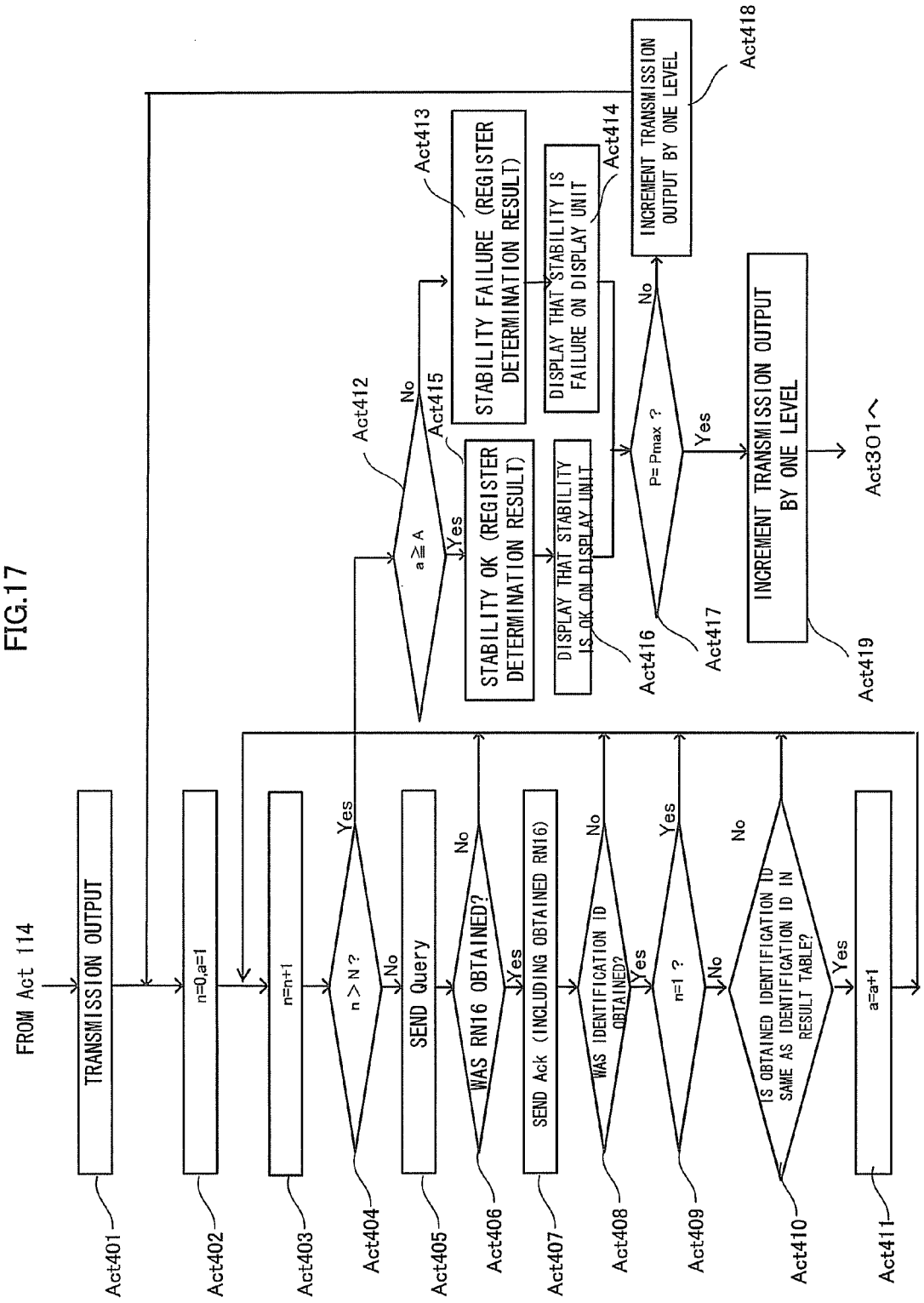
FIG. 17 is a diagram illustrating a selective communication process flow with an RF tag in the second embodiment.

In the second embodiment, the storage unit 311 stores result tables for each of transmission outputs. The round control unit 60 performs registration such that the respective result tables hold the results for each of the transmission outputs for the selective readings. FIG. 16 shows an example of the result table. In addition, the communication stability determination unit 69 performs a registration to the determination table based on the respective result tables holding the results for each of the transmission outputs for the selective readings such that the determination results of the communication stabilities for each of the transmission outputs are held. FIG. 17 shows an example of the determination table.

The output setting unit 73 obtains the determination table, which holds the determination results of the communication stabilities for each of the transmission outputs, from the storage unit 311, sets a transmission output value for the selective writing by the tag information writing unit 319 based on the determination table. That is, the transmission output control unit 315 controls the wireless unit 33 such that the radio waves are radiated at a transmission output value set by the output setting unit 73.

An optimal value for the transmission output for the respective operations differs depending on the type of the RF tag to be used and a communication environment where the operation is performed (for example, material of the wall, material of the shelf in which the RFID tag is placed, material of the product to which the RFID tag is attached, density of the RF tags, and the like). In particular, in the case of the selective reading or the selective writing, it is necessary to communicate only with the target RF tag without communicating with the RF tag which is not the communication target. Accordingly, the optimal transmission output greatly differs depending on the above-mentioned environment. For this reason, according to the second embodiment, it is possible to perform the selective communication with the RF tag at a more suitable transmission output. Therefore, it is possible to further enhance the reliability of the communication.

Next, a description will be made of the process flow of the setting of the transmission output for the selective writing according to the second embodiment with reference to FIG. 17. In addition, since Act 402 to Act 416 are the same as Act 201 to Act 215 shown in FIG. 12, the description thereof will be omitted.

First, in Act 501, the output changing unit 71 of the transmission output control unit 315 sets the transmission output to Pmin, which is the minimum value in the 10 levels, based on the output information stored in the storage unit 311.

In addition, in Act 417, the control unit 31 determines whether or not the transmission output of the radio waves to be radiated is set based on the output information indicating Pmax as a maximum value in the 10 levels. In other words, the control unit 31 determines whether or not the transmission output is Pmax. This determination can be performed based on a process record (log) by the output changing unit 71 stored in the storage unit 311, for example.

If it is determined that the transmission output is not Pmax in Act 417, the output changing unit 71 sets the transmission output to be greater by one level based on the output information in Act 418. Then, the control unit 31 executes the processes from Act 201 again.

On the other hand, if it is determined that the transmission output is Pmax in Act 417, the output setting unit 73 sets the transmission output value relating to the selective writing based on the determination table in Act 419. Then, the control unit 31 moves on to Act 301 and executes the writing process.

Figure 18:
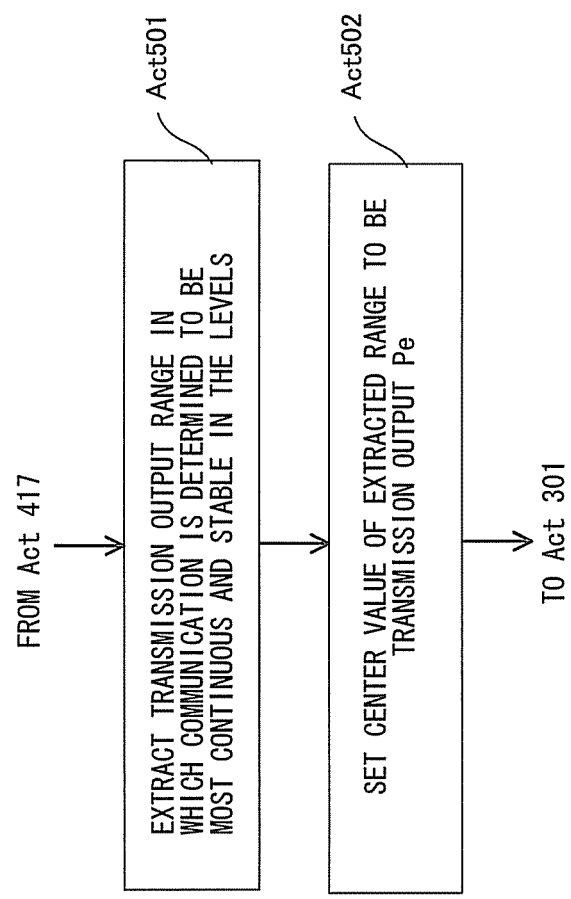
FIG. 18 is a diagram illustrating a selective communication process flow with an RF tag in the second embodiment.

Next, a detailed description will be made of the process flow of the transmission output setting by the output setting unit 73 according to the second embedment with reference to FIG. 18. First, in Act 501, the output setting unit 73 extracts the transmission output range, in which the communication is stable for the longest time, from among the 10 levels based on the determination table. For example, if the extraction is made based on the determination table shown in FIG. 16, the transmission outputs P02 to P08 are extracted. Then, in Act 502, the output setting unit 73 sets the transmission output P05, which corresponds to a center value of the transmission outputs P02 to P08 as the extracted transmission output range, as the transmission output for the selective writing from Act 301.

Here, in regard to the stability based on the magnitude of the transmission output, there are cases in which the determination that the communication is stable (OK) and the determination that the communication is not stable (NG) are switched depending on the surrounding environment. For example, there can be a case of OK in P01, NG in P02, OK in P03, OK in P04 to P07, NG in P08, OK in P09, and NG in P10. Accordingly, it is possible to set the transmission output with which more stable communication is capable, by extracting the transmission output range, which is determined to be most continuous and stable, in the transmission output levels in the above-mentioned manner and setting the transmission output to be used for the selective writing based on the extracted transmission output range. In addition, while the above description was made while exemplifying the center value, the transmission output is not limited thereto. Average value of the extracted transmission output, a value lower by one level than the maximum value in the extracted transmission range, or the like may be used as the transmission output, and the transmission output is not limited.

In addition, according to the second embodiment, although the output changing unit 51 also changes the transmission output of the radio waves relating to Ack sent from the tag information requesting unit 45, the output changing unit 51 may be configured to change only the transmission output of the radio waves relating to Query sent from the response requesting unit 41.

Although the above description was made while exemplifying the case of the selective writing, the communication stability may be determined by changing the transmission output in the same manner for the case of the selective reading. In such a case, for example, the identification ID read in the transmission output range in which the communication is determined to be most continuous and stable may be determined as an identification ID as the communication target.

Third Embodiment

Next, a description will be made of a third embodiment. According to the third embodiment, the transmission output control unit 315 sets the transmission output of the radio waves when the tag writing unit 319 writes data to be greater than that of the radio waves when the response requesting unit 41 sends Query and that of the radio waves when the tag information requesting unit 45 sends Ack. That is, in the third embodiment, the transmission output control unit 315 corresponds to an output adjusting unit.

In addition, in the third embodiment, the storage unit 311 stores output information (P) indicating transmission output P and output information (P') indicating a transmission output which is greater than the transmission output P, as the transmission output of the radio waves for the selective writing. If the response requesting unit 41 sends Query and if the tag information requesting unit 45 sends RN16, the transmission output control unit 315 controls the wireless unit 33 based on the output information (P). On the other hand, if the tag writing unit 319 writes data, the transmission output control unit 315 controls the wireless unit 33 based on the output information (P').

Generally, the RF tag is required to rewrite the memory within the RF tag when data is written to the RF tag. Accordingly, more electromagnetic wave energy than that for reading the data from the RF tag is required. For this reason, it is possible to prevent errors due to the lack of the electromagnetic wave energy from occurring in the selective writing according to the third embodiment.

Figure 19:
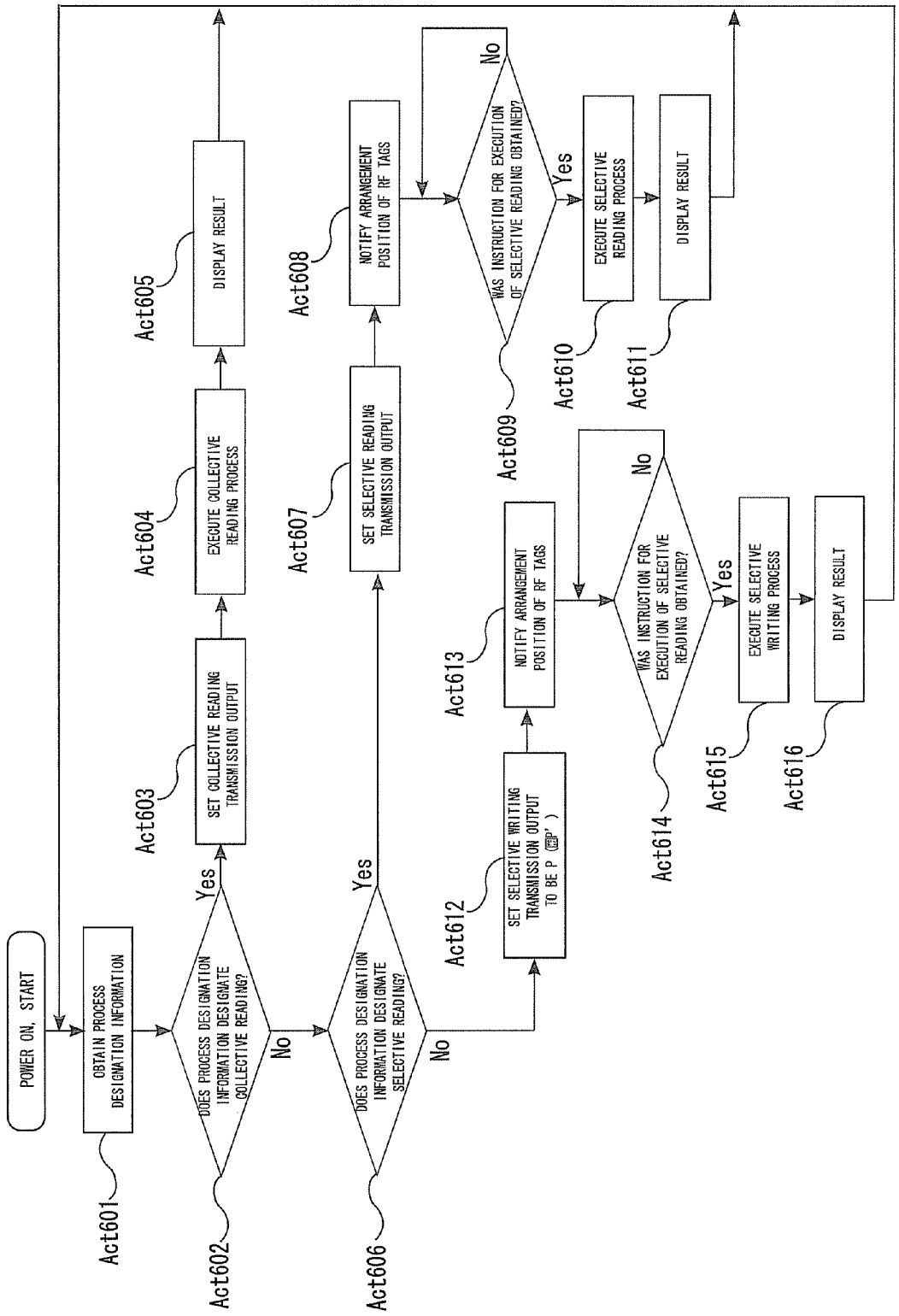
FIG. 19 is a diagram illustrating a selective communication process flow with an RF tag in a third embodiment.

A description will be made of the process flow for the communication with the RF tag according to the third embodiment. Since the process flow shown in FIG. 19 is the same as that in FIG. 8 described in the first embodiment except for Act 612, the description will be omitted. In addition, since the process flow shown in FIG. 20 is the same as that in FIG. 12 described in the first embodiment except for Act 707 and Act 708, the description will be omitted.

First, in Act 612 in FIG. 19, the transmission output control unit 315 controls the wireless unit 33 based on the output information (P) such that the transmission output of the radio waves becomes transmission output P.

Figure 20:
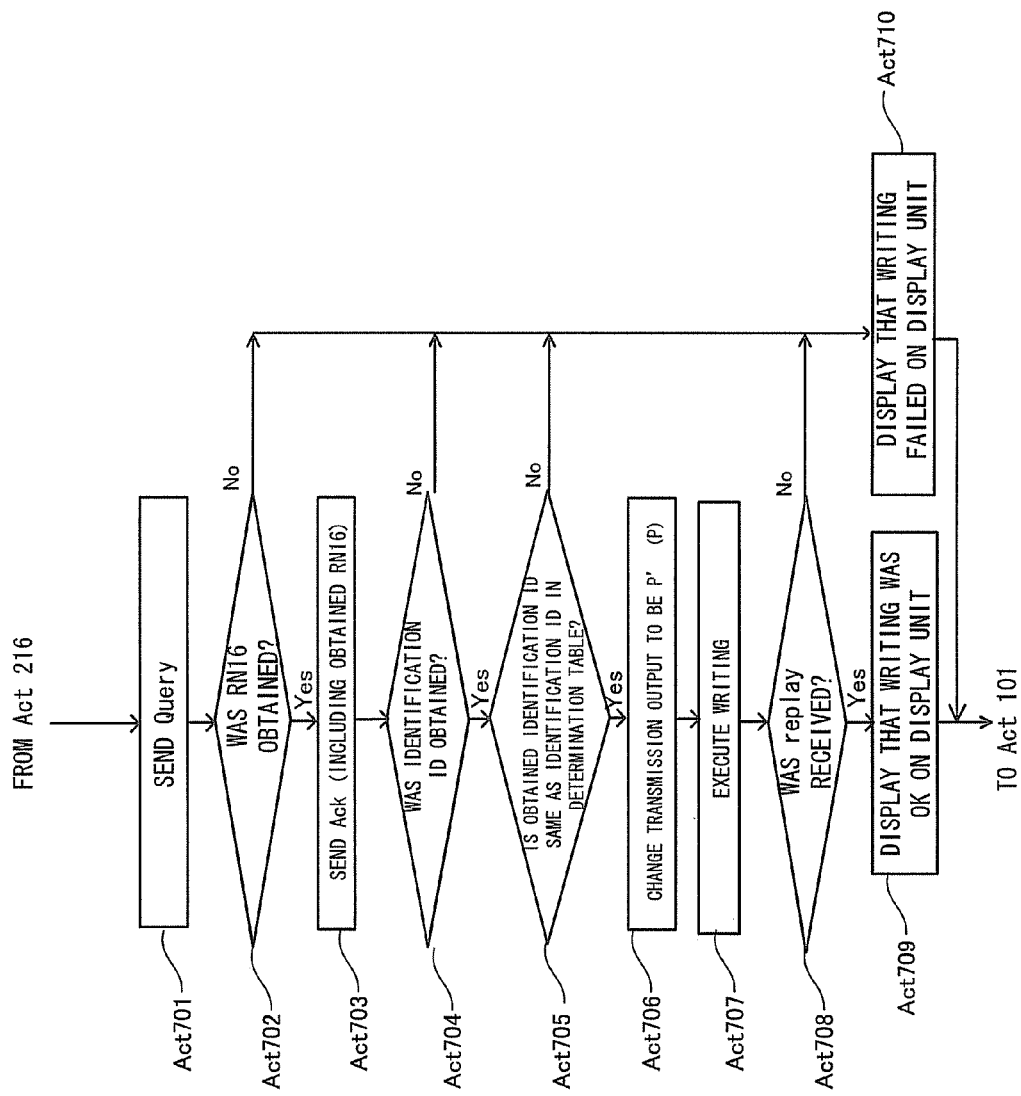
FIG. 20 is a diagram illustrating an example of a determination table according to a fourth embodiment.

In addition, in Act 706 in FIG. 20, the transmission output control unit 315 controls the wireless unit 33 based on the output information (P') such that the transmission output of the radio waves becomes the transmission output P' which is greater than the transmission output P. Next, in Act 707, the tag writing unit 319 performs the writing process to the RF tag. The transmission output of the radio waves for this writing process is the transmission output P' which is greater than the transmission output P at the time of sending Query and Ack.

In the third embodiment, although the only the transmission output of the radio waves for the writing process by the tag writing unit 319 is set to be greater, it is also applicable that the transmission output is set to be greater when communication with one RF tag is being established in one slot. Specifically, the transmission output of the radio waves at the time of sending Ack to the RF tag is set to be greater than the transmission output of the radio waves at the time of sending Query.

Forth Embodiment

Hereinafter, a fourth embodiment will be described. The same reference numerals will be given to the common parts to those in the first embodiment, and the description thereof will be omitted.

According to the RF tag reader and writer 100 of the fourth embodiment, the round control unit 60 of the control unit 31 performs the selective writing by the communication unit 313 described in the first embodiment on the RF tag on which the tag writing unit 319 performed the writing (hereinafter, referred to as a writing-completed RF tag), in accordance with the writing process by the tag writing unit 319. When the communication unit 313 obtained identical information (identification ID written by the tag writing unit) from the writing-completed RF tag over the predetermined plural number of times, the communication stability determination unit 69 determines that the writing process to the writing-completed RF tag succeeded, in the same manner as described in the first embodiment. Then, the communication stability determination unit 69 registers the determination result in a writing determination table (FIG. 21) stored in the storage unit 311 in the same manner as the determination table and notifies the control unit 31 of the determination result. The control unit 31 notifies the user of the determination result via the display unit 37 based on the notification from the communication stability determination unit 69.

Figure 22:
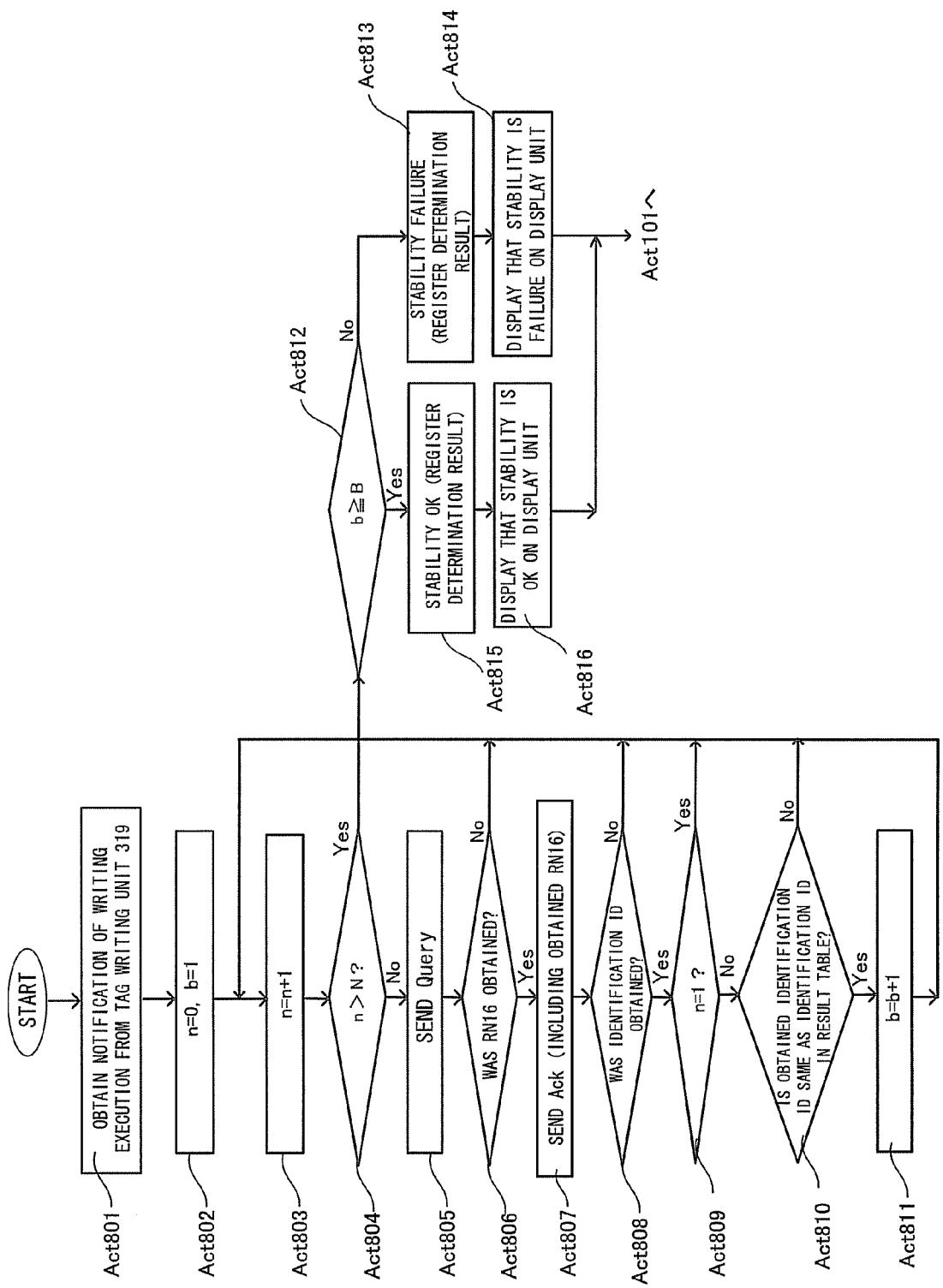
FIG. 22 is a diagram illustrating a selective communication process flow with an RF tag in the fourth embodiment.

That is, the communication stability determination unit 69 of the fourth embodiment also corresponds to the successful writing determination unit. In addition, FIG. 22 shows the process flow relating to the successful writing determination. However, since the process flow from Act 802 is the same as that in FIG. 12 shown in the first embodiment, the description thereof will be omitted. In Act 801, the round control unit 60 obtains the notification regarding the execution of the writing process from the tag writing unit 319. Then, the control unit 31 performs the process from Act 802. In addition, in FIG. 21, b represents the reading times in the process in which the writing-completed RF tag is the communication target, and B represents a value indicated by the stability lower-limit information, for easy understanding.

Other Embodiment

Although the present invention was described as above, it is not limited thereto, and other embodiments can be also applied.

For example, in the first to fourth embodiments, the description was made while assuming that one RF tag is the communication target in the selective communication, for easy understanding. However, the present invention is not limited thereto, and it are also applicable that a plurality of RF tags are the communication targets. In addition, if a plurality of RF tags are the communication targets, the number of slot in accordance with the slot ALOHA method is also set to be a plural number. At this time, the number of the slots is applicable as long as it is set to be not less than the number of RF tags as the communication targets, and both the numbers do not necessarily coincide. By changing the number of slots in accordance with the number of communication targets as described above, it is possible to reduce collisions and thereby implement stable communication with the target RF tags even if a plurality of RF tags are the communication target.

In addition, in the first embodiment, the storage unit 311 in the reader and writer main body 30, which is constituted by a ROM and a RAM, stores the output information for controlling the transmission output, the setting information relating to the determination of the communication stability such as the round number information, the result table, and the determination table. However, the present invention is not limited thereto. A storage unit in an external device may store them, and the control unit 31 may obtain them via the interface unit 39 if necessary.

Furthermore, in the first embodiment, the transmission output is set based on the output information stored in advance. However, it is also applicable that the user sets the transmission output via the input unit 35. In addition, in the third embodiment, the transmission output of the radio waves for the writing process is automatically set to be greater based on the output information. However, another configuration is also applicable in which the user is notified to change the transmission output to be greater via the display unit 37.

Furthermore, in the determination that the writing succeeded in the fourth embodiment, still another configuration is also applicable in which it is determined whether the ID obtained from the writing-completed RF tag by the communication unit 313 and the identification ID stored in the storage unit 311 as a record (log) relating to the process are identical. With such a configuration, it is possible to more reliably determine the success of the writing.

Furthermore, in the third embodiment, the storage unit 311 is configured to store the output information indicating different transmission outputs which respectively correspond to the writing and the selective reading. However, the present invention is not limited thereto, and it is also applicable that the transmission output for the selective reading by the communication unit 313 is set in accordance with the process shown in the second embodiment, and that the tag writing unit 319 performs writing process with the radio waves at a greater transmission output than the set transmission output. At this time, it is applicable that the center value of the transmission output range in which the communication is most continuous and stable is set as a transmission output for the selective reading, and that the maximum value of the range is set as a transmission output for the writing process.

As another technique, the RF tag reader and writer may be configured to have: a communication unit which includes a response requesting unit for sending a response request command to the RF tag, a response obtaining unit for obtaining a response sent from the RF tag in accordance with the obtaining of the response request command, a tag information requesting unit for sending a tag information request command, which requests the sending of the information held in the RF tag, to the RF tag which sent the response to be obtained, when the response requesting unit obtains the response within a predetermined time after the response requesting unit sent the response request command, and a tag information obtaining unit for obtaining the information, which is sent from the RF tag which sent the response in accordance with the obtaining of the tag information request command, and which is held in the RF tag, the communication unit communicating with the RF tag in a slot ALOHA method; a communication stability determination unit which determines that stable communication with a specific RF tag is being established when the tag information obtaining unit obtains information held in the RF tag from the RF tag which sent the response; a tag writing unit for performing data writing on the RF tag, from which the response and the information held therein were obtained, when it is determined that stable communication with a specific RF tag is being established; and an output adjusting unit for changing the transmission output of the radio waves for the data writing by the tag writing unit with respect to the RF tag to be greater than the transmission output of the radio waves for the response request command by the response requesting unit with respect to the RF tag.

As described above in detail, according to the technique disclosed in this specification, it is possible to implement the collective communication with one or a plurality of specific RF tags, and to more reliably communicate with one or a plurality of RF tags in the selective communication with them.

While certain embodiments have been described, these embodiments have been presented by way of example only, and are not intended to limit the scope of invention. Indeed, the novel apparatus, methods and computer readable media described herein may be embodied in a variety of other forms; furthermore, various omissions, substitutions and changes in the form of the apparatus and methods and computer readable media described herein may be made without departing from the spirit of the inventions. The accompanying claims and their equivalents are intended to cover such forms or modifications as would fall within the scope and spirit of the inventions.

What is claimed is:

1. A radio frequency (RF) tag reader and writer comprising:
    a communication unit configured to communicate with an RF tag as a target from which first information is obtained and obtain the first information held in the RF tag wherein the communication unit comprises a response requesting unit configured to send a response request command to the RF tag over a plural number of times;
    a response obtaining unit configured to obtain a response sent from the RF tag in response to the response request command;
    a tag information requesting unit configured to send a tag information request command, which requests a sending of the first information held in the RF tag, to the RF tag in response to the response obtaining unit obtaining the response within a predetermined time after the response requesting unit sends the response request command; and
    a tag information obtaining unit configured to obtain the first information, which is sent by the RF tag in response to the tag information request command;
    a communication stability determination unit configured to determine that stable communication with the RF tag is being established in response to a determination that a same set of first information is obtained over a predetermined plural number of times from the RF tag communicating with the communication unit;
    a tag writing unit configured to write data to the RF tag in response to a determination by the communication stability determination unit that stable communication with the RF tag is being established; and
    an output adjusting unit configured to set a transmission output of radio waves for a data writing to the RF tag by the tag writing unit to be greater than a transmission output of radio waves for the response request command by the response requesting unit with respect to the RF tag.

2. The RF tag reader and writer according to claim 1,
    wherein the RF tag reader and writer is further configured to communicate with the RF tag in a slot ALOHA method, and
    wherein the RF tag reader and writer further comprises a slot number setting unit capable of changing a setting of a slot number in the slot ALOHA method based on an operation input.

3. The RF tag reader and writer according to claim 1, further comprising:
    an output changing unit configured to change a transmission output of radio waves based on output information, which is set in advance, regarding the transmission output of radio waves for communication between the communication unit and the RF tag,
    wherein the communication stability determination unit determines whether stable communication with the RF tag is being established in response to the output changing unit changing the transmission output of the radio waves for communication between the communication unit and the RF tag.

4. The RF tag reader and writer according to claim 1,
wherein the communication unit is further configured to communicate with a writing-completed RF tag, to which data was written, in accordance with the data writing by the tag writing unit and obtain second information held in the writing-completed RF tag, and
wherein the RF tag reader and writer further comprises a successful writing determination unit configured to determine that a writing process to the writing-completed RF tag has completed in response to the communication unit obtaining the second information held in the writing-completed RF tag over a predetermined plural number of times.

5. A radio frequency (RF) tag reader and writer comprising:
a communication unit comprising a response requesting unit configured to send a response request command to the RF tag, a response obtaining unit configured to obtain a response sent from the RF tag in response to receiving the response request command, a tag information requesting unit configured to send a tag information request command, which requests a sending of information held in the RF tag, to the RF tag in response to the response requesting unit receiving the response within a predetermined time after the response requesting unit sent the response request command, and a tag information obtaining unit configured to obtain the information, which is sent from the RF tag, wherein the communication unit communicates with the RF tag in a slot ALOHA method;
a communication stability determination unit configured to determine that stable communication with the RF tag is being established when in response to the tag information obtaining unit obtaining the information held in the RF tag;
a tag writing unit configured to perform a data writing on the RF tag, in response to the communication stability determination unit determining that stable communication with the RF tag is being established; and
an output adjusting unit configured to change a transmission output of radio waves for the data writing to be greater than a transmission output of radio waves for the response request command by the response requesting unit with respect to the RF tag.

6. An RF tag communication stability determination method comprising:
communicating with an RF tag as a target from which information is obtained and obtaining the information held in the RF tag by sending a response request command to the RF tag over a plural number of times;
obtaining a response sent from the RF tag in accordance with the response request command;
sending a tag information request command, which requests a sending of the information held in the RF tag, to the RF tag in response to the response being obtained within a predetermined time after the sending of the response request command;
obtaining the information which is sent from the RF tag, wherein the RF tag sends the response in accordance with obtaining of the tag information request command;
determining that stable communication with the RF tag is being established in response to identical information being obtained from the RF tag over a predetermined plural number of times;
setting a first transmission output of radio waves for a data writing with respect to the RF tag to be greater than a second transmission output of radio waves for the response request command with respect to the RF tag; and
performing the data writing to the RF tag in response to a determination that that stable communication with the RF tag is being established.

7. The method according to claim 6,
wherein the communication with the RF tag is performed in a slot ALOHA method, and
wherein a setting of a number of slots in the slot ALOHA method is changed based on an operation input.

8. The method according to claim 6, further comprising:
changing a transmission output of radio waves based on output information, which is set in advance, regarding the transmission output of the radio waves for communication with the RF tag; and
determining whether stable communication with the RF tag is being established in response to the transmission output of the radio waves for the communication with the RF tag being changed.

9. The RF tag reader and writer according to claim 1,
wherein the communication unit is further configured to communicate with a writing-completed RF tag, to which data was written, in accordance with the data writing by the tag writing unit and obtain second information held in the writing-completed RF tag, and
wherein the RF tag reader and writer further comprises a successful writing determination unit configured to determine that a writing process to the writing-completed RF tag has completed in response to a determination that the communication unit has obtained the second information over a predetermined plural number of times.

* * * * *